(12) United States Patent
Liu et al.

(10) Patent No.: US 11,705,016 B2
(45) Date of Patent: Jul. 18, 2023

(54) INTEGRATED SYSTEM FOR ART EXAMINATION AND EXAMINATION METHOD BASED THEREON

(71) Applicant: CHINA ACADEMY OF ART, Hangzhou (CN)

(72) Inventors: Zheng Liu, Hangzhou (CN); Yajuan Wu, Hangzhou (CN); Huijun Hu, Hangzhou (CN); Yun Wang, Hangzhou (CN); Donghong Zhou, Hangzhou (CN)

(73) Assignee: CHINA ACADEMY OF ART, Hangzhou (CN)

( * ) Notice: Subject to any disclaimer, the term of this patent is extended or adjusted under 35 U.S.C. 154(b) by 743 days.

(21) Appl. No.: 16/795,719

(22) Filed: Feb. 20, 2020

(65) Prior Publication Data
US 2020/0265738 A1 Aug. 20, 2020

(30) Foreign Application Priority Data
Feb. 20, 2019 (CN) .......................... 201910126506.X (51) Int. Cl.
| | | |
|---|---|---|
| G09B 7/02 | (2006.01) | |
| G09B 11/10 | (2006.01) | |
| G09B 3/00 | (2006.01) | |
| G09B 19/00 | (2006.01) | |
| G06F 21/31 | (2013.01) | |
| G06V 40/13 | (2022.01) | |
| G06V 40/16 | (2022.01) | |

(52) U.S. Cl.
CPC .............. *G09B 7/02* (2013.01); *G06F 21/31* (2013.01); *G09B 3/00* (2013.01); *G09B 11/10* (2013.01); *G09B 19/003* (2013.01); *G06V 40/13* (2022.01); *G06V 40/16* (2022.01)

(58) Field of Classification Search
CPC ......... G09B 11/10; G09B 19/003; G09B 3/00
See application file for complete search history.

(56) References Cited

U.S. PATENT DOCUMENTS

| | | | | |
|---|---|---|---|---|
| 2013/0262333 A1* | 10/2013 | Wicker | ................... | G06Q 10/00 705/325 |
| 2014/0222995 A1* | 8/2014 | Razden | ..................... | G09B 7/02 709/224 |
| 2015/0339937 A1* | 11/2015 | Martin | ..................... | G09B 7/00 434/350 |

* cited by examiner

*Primary Examiner* — Robert J Utama
(74) *Attorney, Agent, or Firm* — Bayramoglu Law Offices LLC (57) ABSTRACT

An integrated system for art examination includes a power module, an information receiving and a storage module, an information processing module, a control module, a display module, a paper printing module, and a paper processing module; the information receiving and storage module is used to receive and transmit an examinees registration information, an examination room information and an on-site identity information to the information processing module; the information processing module is used to verify whether the examinees registration information is consistent with the on-site identity information and transmits a conclusion to the control module; the control module controls the display module, the paper printing module and the paper processing module; the display module is used to display information to guide an exam worker how to operate, and an input of the examinee's on-site identity information is completed on the display module through a human-computer interaction.

15 Claims, 5 Drawing Sheets

INTEGRATED SYSTEM FOR ART EXAMINATION AND EXAMINATION METHOD BASED THEREON

CROSS-REFERENCE TO RELATED APPLICATIONS

This Non-provisional application claims priority under 35 U.S.C. § 119(a) on Chinese Patent Application No(s). CN201910126506.X filed on Feb. 20, 2019, the entire contents of which are hereby incorporated by reference.

BACKGROUND OF THE INVENTION

Technical Field

The invention relates to a technical field of examination management, in particular to an integrated system for art examination and examination method based thereon.

Technical Background

Art examination is different from other examinations, and there are a large number of examinees in the art exam compared to the ordinary examination room. The seats of art examination are uncertain. The art examination has certain particularity, each examinees needs to bring his or her own painting tool, which causes a series of problems such as the examinees may enter the examination room back and forth in the early stage of the examination, which leads to confusion in the examination room. Due to the setting of the subjects of the art examination, the examination forms are mostly divided into two categories—sketch or write. Because of the particularity of sketching, models or still life objects need to be placed in the middle of the examination room. Examinees have certain requirements on the painting angle, may cause examinees to seize the seat angle of the examination room.

Due to the particularity of art subjects, according to the drawing requirements, the time of most subjects of the art examination is more than 4-6 hours, which leads to a series of problems of entering and leaving the examination room during the examination for most examinees. Moreover, the time limit of entering and leaving the examination room for examinees cannot be effectively controlled, resulting in frequent verification and examination for each examinees entering and leaving the examination room. Due to the particularity of the art paper, the examinees needs the time to carry on the later processing to the finished paper, the behavior that the delay turns in the paper is forbidden repeatedly, the examinees have a poor sense of time, thus causing very big influence to the examination work and the examination room discipline.

The art examination work and art grading work every year is huge, and there is a great responsibility to do these works. The scoring work currently used is all manual operation, with high error rate and large input of personnel and funds. Each ordinary examination room can be equipped with one exam worker to complete the work of issuing, receiving and invigilating the examination. However, due to the complexity of the art examination, the art examination room should be equipped with at least two or three exam workers. In order to ensure the validity and completion of each examinee's papers, exam workers need to verify the identity of one by one, paste the QR code, and issue the papers. After the examinees turns in the papers, they must check each paper one by one, dry it one by one, and preserve the pictures to seal the papers. Sometimes due to the exam worker's improper operation, the paper surface may be damaged and there will be examinees for the loss of admission ticket, identity card loss and other related circumstances, increasing the workload of the exam.

In the professional art examination, there will be sketch or color painting. As a result of the use of pencil or charcoal for painting, most of the sketch papers should be sprayed with paint solution at the end of the examination, to prevent some damage to the paper surface in the late handing in process or in the process of paper transportation. Because the society such as art examinations at various levels are generally between the December to February next year, the cold weather images of the drying temperature low favor gouache paper, the cold weather and low temperature are not conducive to the dry picture of gouache papers. The natural drying process of the colored paper painted with gouache or watercolor is slow. And the examination of art major requires that the pictures can be dried as soon as possible to ensure that the papers are handed in on time and the papers are not polluted. In chamber of rain or snow with low temperature, it will take longer for the color rolls to dry or blow dry naturally, which will cause examinees to hand in the papers late and disturb the discipline of the examination room. If the papers are not dry enough, the pictures of the papers will be polluted and adhered to each other, which will damage the pictures of the papers and seriously affect the artistic effect of the examinees' pictures and their scores. At the same time, the stained paper also causes some difficulties to the marking work, cannot correctly judge the fair and reasonable results.

Examinees often bring a small hand-held fan or home hair dryer to dry the color screen. Small blower fan with small air volume and no heating function, cold air drying effect is slow and not obvious, operation, carry also inconvenient. If the use of household hair dryer is easy to cause the picture of wrinkling, rolling, gouache paint over drying, cracking and peeling, and even scorch the roll. In addition, the use of hair dryers in the examination room also has serious potential electricity safety hazards and noise pollution.

Since the examination of art major is mostly set by universities, the provincial school take an examination of in the process of transportation cause are leaking questions each year, the leakage problem of events and the examinees identity information in the process of evaluation are not effective confidentiality, it will greatly influence the equity and justice of the exam, great negative effects on the examination of fine arts.

BRIEF SUMMARY OF THE INVENTION

In view of the above problems, the invention provides an integrated system for art examination and an examination method based on thereon, which can more conveniently organize the examination, accurately record, statistic, store and backup the examination situation and structure, and efficiently complete the examination process.

The technical scheme adopted by the invention is as follows: An integrated system for art examination, connected with an examination administration network, wherein the integrated system includes a power module, an information receiving and a storage module, an information processing module, a control module, a display module, a paper printing module, and a paper processing module; the power module is used to provide power support; the information receiving and storage module is used to receive and transmit an examinees registration information, an examination room information and an on-site identity information to the information processing module; the information processing module is used to verify whether the examinees registration information is consistent with the on-site identity information and transmits a conclusion to the control module; the control module controls the display module, the paper printing module and the paper processing module; the display module is used to display various information of each step to guide an exam worker how to operate, and an input of the examinee's on-site identity information is completed on the display module through a human-computer interaction; the paper printing module is configured to print information on the paper and complete a sending and receiving of the paper; the paper processing module is used for processing the paper according to a painting type and passing the processed paper to the paper printing module for collecting and sorting.

Preferably, the information receiving and storage module may include a network transmission device, an identification device, and an input device, the network transmission device may be connected with the examination administration network to receive the examinees registration information and the examination room information, the identification device may be used to identify the examinee's on-site identity information, and the input device may be used for inputting the examinee's on-site identity information and a situation description.

Preferably, the paper printing module may include an information printing device, a paper sending device and a paper receiving device, the information printing device may be used to print information on the paper, the paper sending device may be used to send papers with printed information, and the paper receiving device may be used to receive papers completed by examinees.

Preferably, the paper processing module may include a drying device, a preserving device and a mounting device, the drying device, the preserving device and the mounting device may be used to dry, preserve and mount papers respectively.

Preferably, the paper processing module further may include a scanning and checking device, the scanning and checking device may be used to scan and check a completeness and the examinee information of the paper before the paper may be preserved and mounted, and the examinee information of the paper may be scanned and electronically uploaded to the examination administration network.

Preferably, the paper receiving device may include a counter, a packer, and a wastepaper receiver, the counter may be used for counting the number of mounted papers, the packer may be used for packing the counted papers into a book, and the wastepaper receiver may be used for receiving the examinees' waste papers.

Preferably, the identification device may include a camera, a fingerprint collector and an ID card reader, the camera, the fingerprint collector and the ID card reader may be respectively used to collect and transmit the examinee's on-site identity information, a fingerprint information and a ID card information to the information processing module.

An examination method using the any one of the above-mentioned integrated system for art examination includes the following steps:

(1) starting the power module by the exam workers firstly, and the integrated system begins to work;

(2) the information receiving and storage module is automatically connected with the examination administration network to receive the corresponding examination room information, the examinees registration information and the examination information from the examination administration network, and these three information is displayed by the display module;

(3) the examinees enter an exam room in turn and input their on-site identity information at the display module, the on-site identity information is received by the information receiving and storage module and then passed to the information processing module, and the information processing module verifies the on-site identity information of the examinees with the registration information received from the exam administration network;

(4) when the information processing module verifies that the registration information and the on-site identity information are inconsistent, the control module terminates the examinee's examination process; when the information processing module verifies that the registration information and the on-site identity information are consistent, the examinees passes the verification, and the control module controls the paper printing module to print relevant information on the paper and output the paper to the examinee;

(5) after receiving the paper, the examinees will sit down and answer questions according to the relevant information on the paper;

(6) at the end of the exam, the examinees shall submit the papers in turn, and the exam workers shall select the corresponding processing method at the display module according to the content of the exam, and the papers are received and sorted by the paper processing module.

Preferably, in the step (5), when the examinees needs to leave the examination room halfway during the examination, the examinees must firstly be approved by the exam worker, then leave the examination room after identification at the display module; before re-entry, the examinees need to identify again at the display module before the examinees can enter again.

Preferably, in the step (5), when the paper is damaged, the exam worker will judge whether the paper need be replaced; if the paper need be replaced, the exam worker input a situation description of the examinees at the display module, and then the integrated system will receive the wastepaper and output a new paper.

The beneficial effect of the invention is: The information receiving and storage module and the information processing module of the integrated system cooperate with each other to receive an examinee information and automatically to check the examinees information, which can effectively identify the examinee's examination qualification, eliminate the occurrence of the irregularities such as substitute examination, and greatly reduce the early work of the exam worker. The examinee information may include the examinees registration information, the examination room information and the on-site identity information. The paper printing module automatically prints the examinee information and an exam-related information on the paper, and automatically outputs the paper for examinees to pick up, so that the papers and examinees seating information are distributed on the spot, which improves the fairness and justice of an art exam, and also greatly reduces the workload of exam workers to distributing the papers. The paper processing module can be processed according to the examinee's painting content and then integrated into a book, which does not require manual processing by examinees, thus standardizes the examination time, effectively improves the processing efficiency of examinees' paintings, improves the integrity of painting preservation, and greatly controls the discipline of the examination room.

REFERENCE NUMBERS 1. power module; 2. information receiving and storage module; 21. network transmission device; 22. identification device; 23. input device; 3. information processing module; 4. control module; 5. display module; 6. paper printing module; 61. information printing device; 62. paper sending device; 63. paper receiving device; 7. paper processing module; 71. drying device; 72. preserving device; 73. mounting device; 74. scanning and checking device; 8. frame; 81. information checking and printing area; 82. drying and preserving area; 83. mounting area; 84. receiving area; 9. voice prompt module.

DETAILED DESCRIPTION OF THE INVENTION

The invention is described in detail by combining the attached figures below.

Figure 1:
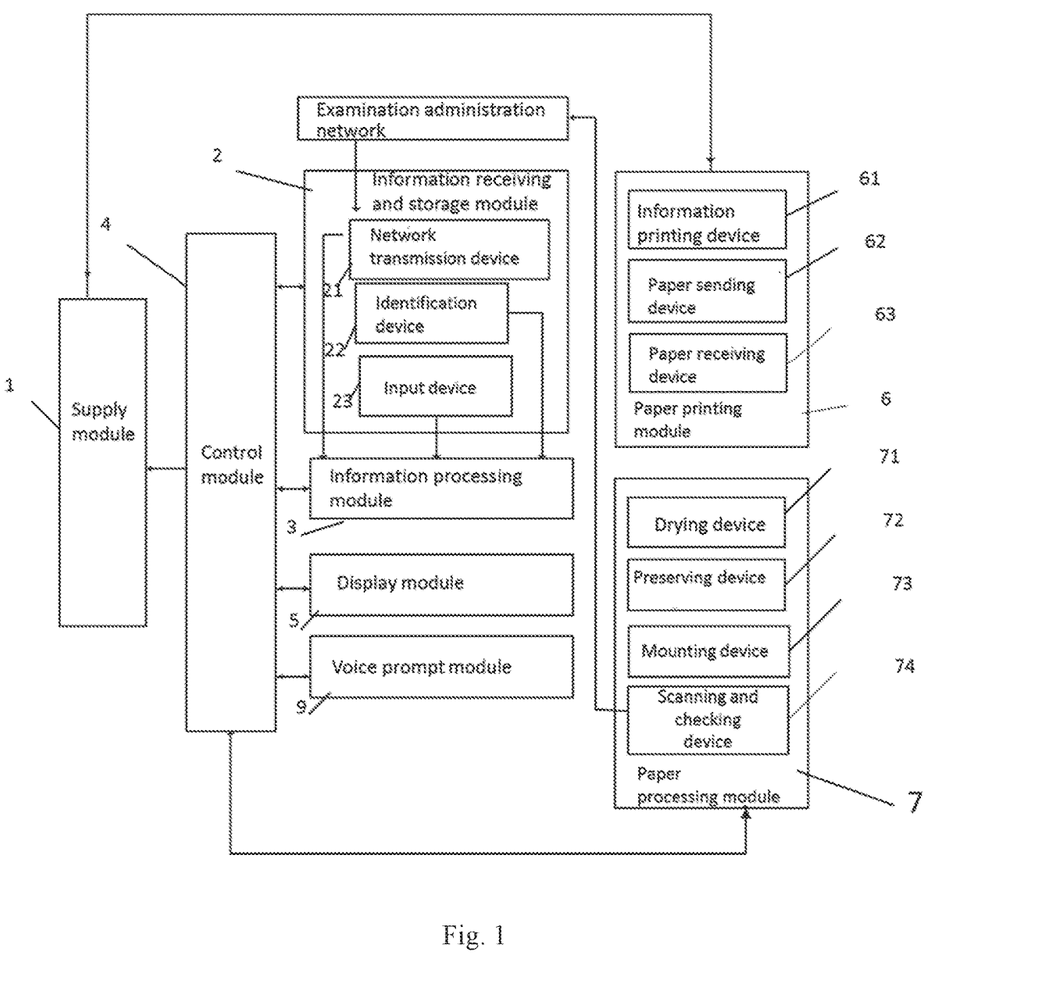
FIG. 1 is a schematic diagram illustrating information transmission between modules of an integrated system and between each module and an examination administration network of an embodiment of this invention.
Figure 2:
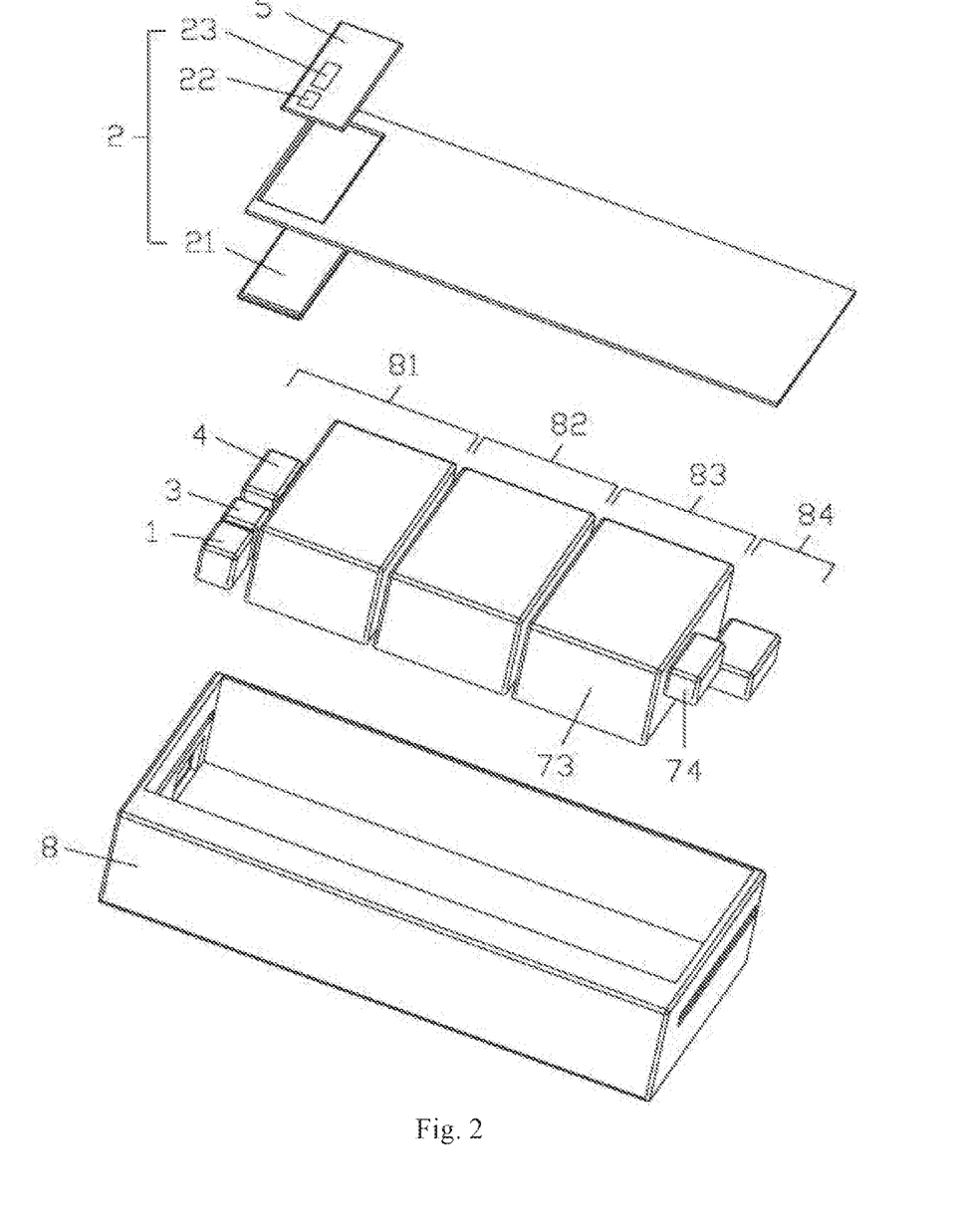
FIG. 2 is a schematic diagram of an explosion structure of the integrated system of an embodiment of the invention.

As show in FIGS. 1-2, an integrated system for art examination is provided and the integrated system is connected with an examination administration network. The integrated system includes a power module 1, an information receiving and a storage module 2, an information processing module 3, a control module 4, a display module 5, a paper printing module 6, and a paper processing module 7.

The power module 1 is used to provide power support;

The information receiving and storage module 2 is used to receive an examinees registration information, an examination room information and an on-site identity information and transmit these three information to the information processing module 3;

The information processing module 3 is used to verify whether the examinees registration information is consistent with the on-site identity information and passes a conclusion to the control module 4;

The control module 4 controls the display module 5, the paper printing module 6 and the paper processing module 7;

The display module 5 is used to display various information of each step to guide an exam worker how to operate, and an input of the examinee's on-site identity information is completed on the display module 5 through a human-computer interaction.

The paper printing module 6 is configured to print information on the paper and complete a sending and receiving of the paper;

The paper processing module 7 is used for processing the paper according to a painting type and passing the processed paper to the paper printing module 6 for collecting and sorting.

The information receiving and storage module 2 and the information processing module 3 of the integrated system cooperate with each other to receive an examinee information and automatically to check the examinees information, which can effectively identify the examinee's examination qualification, eliminate the occurrence of the irregularities such as substitute examination, and greatly reduce the early work of the exam worker. The examinee information may include the examinees registration information, the examination room information and the on-site identity information. The paper printing module 6 automatically prints the examinee information and an exam-related information on the paper, and automatically outputs the paper for examinees to pick up, so that the papers and examinees seating information are distributed on the spot, which improves the fairness and justice of an art exam, and also greatly reduces the workload of exam workers to distributing the papers. The paper processing module 7 can be processed according to the examinee's painting content and then integrated into a book, which does not require manual processing by examinees, thus standardizes the examination time, effectively improves the processing efficiency of examinees' paintings, improves the integrity of painting preservation, and greatly controls the discipline of the examination room.

A frame 8 is also provided in this embodiment, and the frame 8 is divided into an information checking and printing area 81, a drying and preserving area 82, a mounting area 83, and a receiving area 84 in order from beginning to end.

The information receiving and storage module 2 is disposed at the information checking and printing area 81, and the information receiving and storage module 2 includes a network transmission device 21, an identification device 22, and an input device 23. The identification device 22 and the input device 23 both are disposed at the display module 5 to facilitate the real-time interaction of the information displayed on the display module 5 by exam worker and examinees.

The network transmission device 21 is connected with the examination administration network to receive the examinees registration information and the examination room information. In this embodiment, the network transmission device 21 is a computer.

The identification device 22 is used to identify the examinee's on-site identity information. In this embodiment, the identification device 22 includes a camera, a fingerprint collector and an ID card reader, which are respectively used to collect the examinee's on-site identity information, a fingerprint information and a ID card information, and transmit these three information to the information processing module 3.

The input device 23 is used for keying in the examinee's on-site identity information and a situation description.

When verifying the examinee's qualification, the examinees is usually verified by the following methods:

For examinees that both have the ID card and an admission ticket, the ID card information and the fingerprint information is read by the ID card reader and fingerprint reader respectively, and then the exam worker judges an exam qualification of the examinees after a comparison.

For examinees that have lost the ID card, they need to use the input device 23 at the display module 5 to enter their ID card numbers. At the same time, the camera will collect the facial features of the examinees, and the fingerprint reader will collect the fingerprint information of the examinees. The information processing module 3 and the exam worker compare these three information collected on-site with an information downloaded from the examination administration network, and pass a comparison result signal to the control module. If the comparison is consistent, the verification is passed, and the control module controls the paper printing module 6 to print the paper; if the comparison is not consistent, the verification fails, and the control module terminates the examinee's examination process.

For examinees that have lost the admission ticket, they need to put their ID card on the ID card reader for identification. At the same time, the camera will collect the facial features of the examinees, and the fingerprint reader will collect the fingerprint characteristics of the examinees. The information processing module 3 and the exam worker compare these three information collected on-site with an information downloaded from the examination administration network, and pass a comparison result signal to the control module. If the comparison is consistent, the verification is passed, and the control module controls the paper printing module 6 to print the paper; if the comparison is not consistent, the verification fails, and the control module terminates the examinee's examination process.

For examinees that have lost the ID card and the admission ticket, the exam worker uses the input device 23 to input the situation description.

For ID card lost the examinee,

The paper printing module 6 includes an information printing device 61, a paper sending device 62 and a paper receiving device 63, the information printing device 61 and the paper sending device 62 are set in the information checking and printing area 81, and the paper receiving device 63 is set at the receiving area 84.

The information printing device 61 is used to print information on the paper. Specifically, the information processing module will transfer a verified examinee information to the information printing device 61, and the information printing device 61 will print the verified examinees information, an examination information (seat number, examinees number, etc.), a bar code and other examine-related information on a blank paper.

The paper sending device 62 is used to send papers with printed information. The printed papers are output by the paper sending device 62 one by one. The examinees after passing the verification can receive a corresponding paper in turn and find their seats according to a seat number displayed on the paper.

A voice prompt module 9 is also provided in this embodiment. The voice prompt module 9 is used to prompt the exam worker and the examinees how to perform corresponding operations, and also to remind a beginning and end of the examination.

The paper receiving device 63 is used to receive papers completed by examinees. After the end of the exam, the paper is first classified by the paper processing module 7, and finally packaged by the paper receiving device 63.

The paper processing module 7 includes a drying device 71, a preserving device 72 and a mounting device 73, which are used to dry, preserve and mount papers respectively. The drying device 71 and the preserving device 72 are set at the drying and preserving area 82, and the mounting device 73 is set at the mounting area 83.

The drying device 71 includes a first chamber, a heat blower, a first temperature sensor, a second temperature sensor and a humidity sensor.

The first chamber is fixed at the frame 8. The first chamber is provided with an air inlet and an air outlet, and the heat blower and the first temperature sensor are arranged at the air inlet, the heat blower and the first temperature sensor both are connected with the control module 4. The second temperature sensor is set at the air outlet and is also connected to the control module 4. The humidity sensor is set inside the first chamber and is connected to the control module 4. The first temperature sensor, the second temperature sensor, and the humidity sensor respectively feedback an temperature of the air inlet, a temperature of the air outlet, and a humidity inside first chamber to control module 4. After analyzing and judging by the control module 4, an air outlet temperature and an air outlet speed of the heat blower are adjusted to change the temperature of the air inlet of the air outlet of the first chamber, the temperature of the air outlet of the first chamber, and the humidity in the first chamber accordingly, so that the temperature and the humidity of the first chamber are always in a range that facilitates quick drying without damaging the painting. In this embodiment, the temperature range of the air inlet of the first cabinet is 120° C. to 150° C., and the temperature range of the air outlet is 50° C. to 60° C. In this embodiment, the temperature range of the air inlet of the first chamber is 120° C.-150° C., and the temperature range of the air outlet of the first chamber is 50° C.-60° C.

The first chamber is also provided with a turbulence device, the turbulence device is controlled by control module 4 to interfere with a direction of the airflow in the chamber, so that the airflow can flow back and forth in an internal space of the first chamber effectively.

The preserving device 72 is arranged in the first chamber of the drying device 71. The preserving device 72 includes a sprinkler head and a fixative fluid storage. The sprinkler head is fixed at a top of the first chamber, controlled by the control module 4, and connected with the fixative fluid storage. The sprinkler head is used to spray the fixative fluid evenly on the paper and preserve the contents of the paper surface. In this embodiment, the amount of fixative fluid sprayed each time is controlled between 5 ml and 8 ml.

The mounting device 73 includes a second chamber and a laminator. There is also a conveyor belt between the first chamber and the second chamber, and a movement of the conveyor belt is controlled by the control module 4. The papers to be processed are placed on the conveyor belt, and the preserved papers are conveyed from the first chamber to the second chamber for mounting by the conveyor belt. The laminator is responsible for mounting the paper, and meanwhile, non-transparent processing of the examinees information, so as to keep examinees information completely confidential, ensuring a confidentiality and fairness of a marking process.

The paper processing module 7 further includes a scanning and checking device 74. The scanning and checking device 74 is set at the receiving area 84. The scanning and checking device is used to scan and check a completeness and the examinee information of the paper before the paper is preserved and mounted, and the examinee information of the paper is scanned and electronically uploaded to the examination administration network.

The paper receiving device 63 is located at the receiving area 84. The paper receiving device 63 includes a counter, a packer, and a wastepaper receiver. The counter is used for counting the number of mounted papers, the packer is used for packing the counted papers into a book, and the wastepaper receiver is used for receiving the examinees' waste papers.

Figure 3:
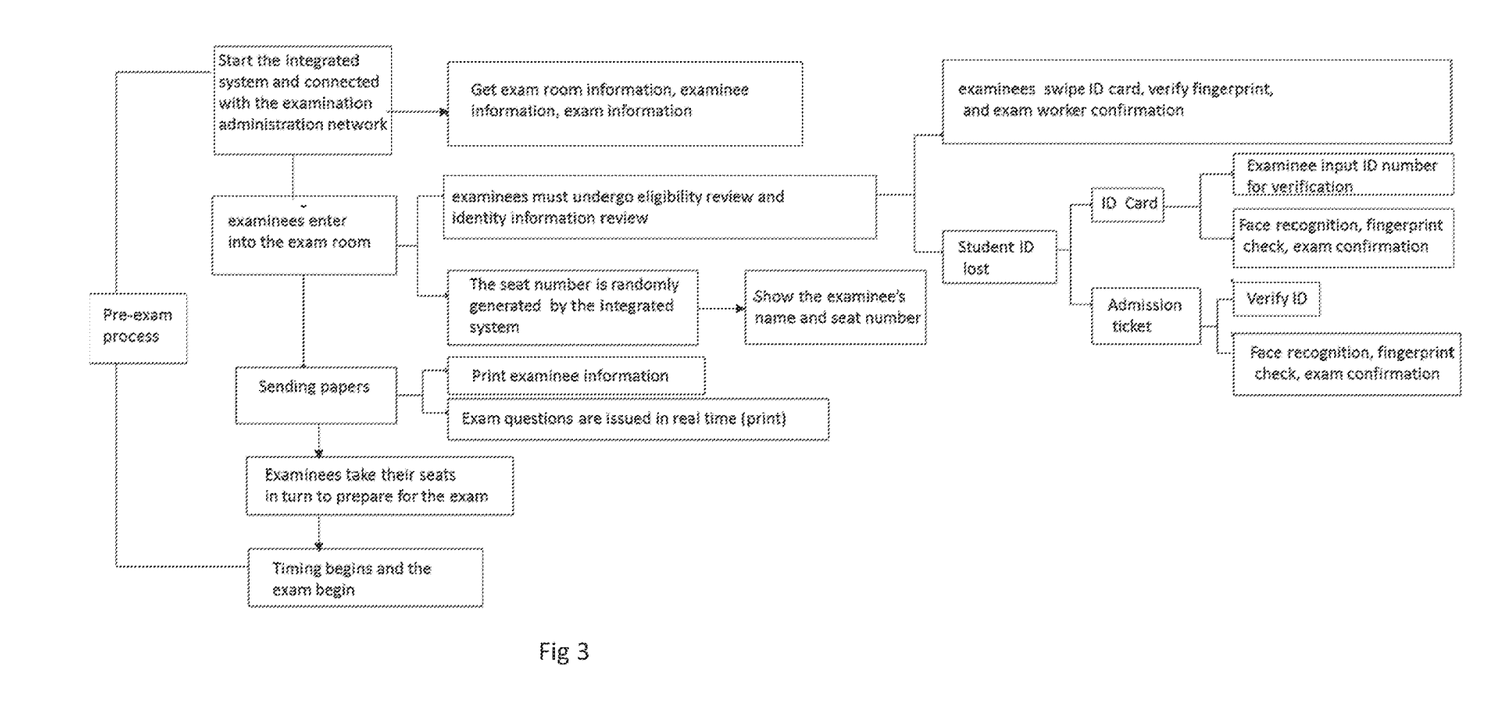
FIG. 3 is schematic flowchart of a pre-exam process of an examination method of an embodiment of the invention.
Figure 4:
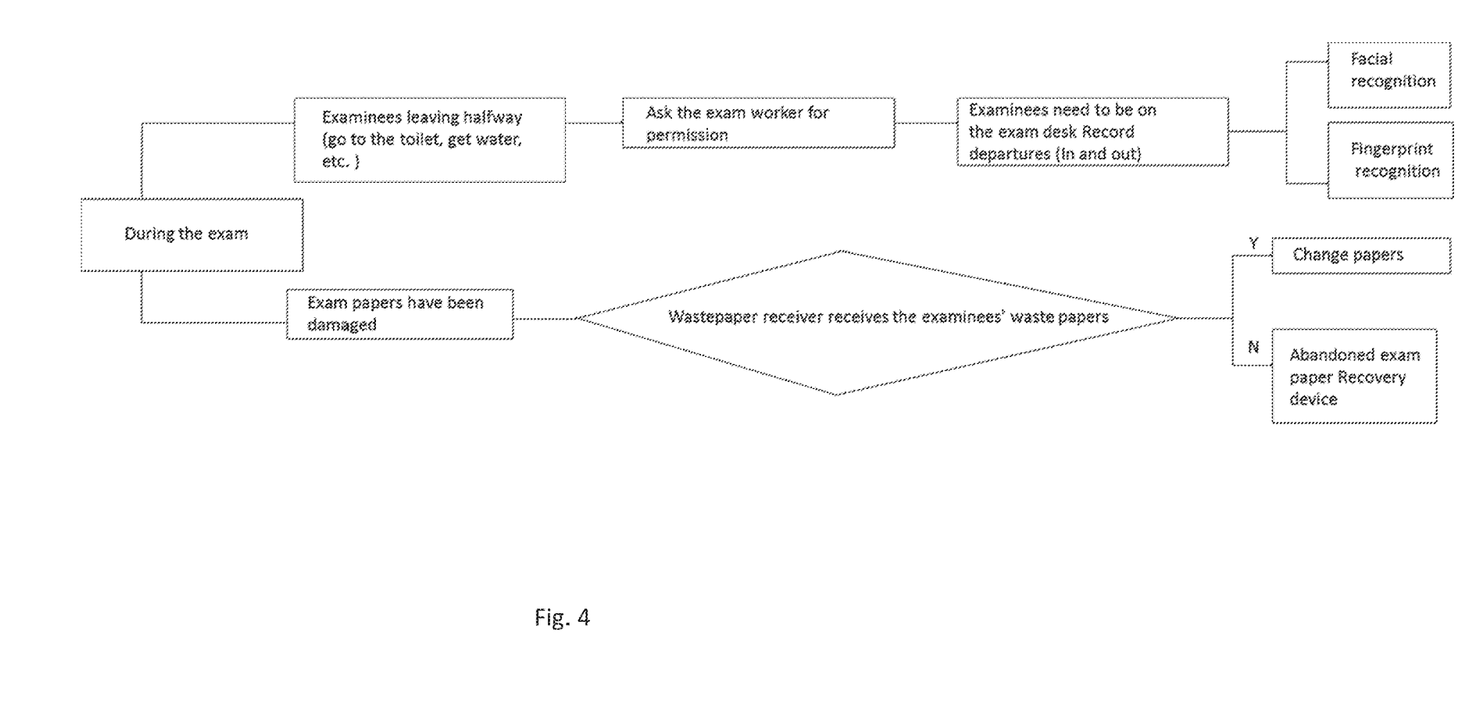
FIG. 4 is schematic flowchart of an examination process of the examination method of an embodiment of the invention.
Figure 5:
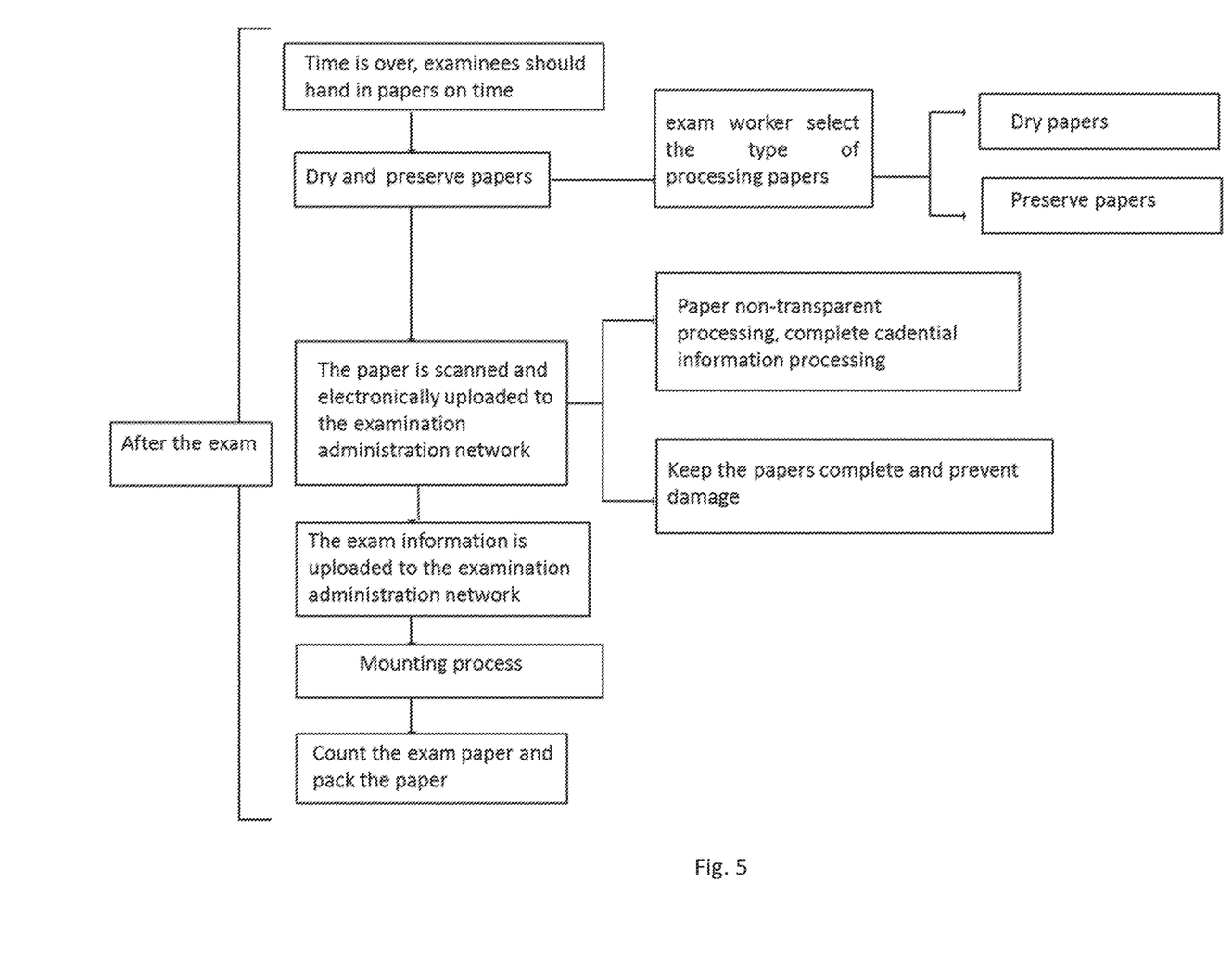
FIG. 5 is a schematic flowchart of a paper processing process after an examination of the examination method of an embodiment of the invention.

As shown in FIGS. 3-5, the embodiment also provides an examination method, which is performed using the integrated system for the art examination as described above, including the following steps.

(1) The exam workers first start the power module 1 and the integrated system begins to work.

(2) The information receiving and storage module 2 is automatically connected with the examination administration network to receive the corresponding examination room information, the examinees registration information and the examination information from the examination administration network, and these three information is displayed by the display module 5.

(3) The examinees enter the exam room in turn and input their on-site identity information at the display module 5. The on-site identity information is received by the information receiving and storage module 2 and then passed to the information processing module 3. The information processing module 3 verifies the on-site identity information of the examinee with the registration information received from the exam administration network.

(4) When the information processing module 3 verifies that the registration information and the on-site identity information are inconsistent, the control module 4 terminates the examinee's examination process; When the information processing module 3 verifies that the registration information and the on-site identity information are consistent, the examinees passes the verification, and the control module 4 controls the paper printing module 6 to print relevant information on the paper and output the paper to the examinee.

(5) After receiving the paper, the examinees will sit down and answer the questions according to the relevant information on the paper; when the examinees needs to leave the examination room halfway during the examination, the examinees must firstly be approved by the exam worker, then leave the examination room after identification at the display module 5. Before re-entry, the examinees need to identify again at the display module 5 before the examinees can enter again; when the paper is damaged, the exam worker will judge whether the paper need be replaced. If the paper need be replaced, the exam worker input a situation description of the examinees at the display module 5, and then the integrated system will receive the wastepaper and output a new paper.

(6) At the end of the exam, the examinees shall submit the papers in turn, and the exam workers shall select the corresponding processing method at the display module 5 according to the content of the exam. The papers are sorted and received by the paper processing module 7.

When the exam worker judges that the paper to be processed as a gouache painting, the drying device 71 works firstly to dry the paper, then the preserving device 72 automatically starts to spray the fixative fluid on the paper, and finally the mounting device 73 mounts; When the exam worker judges the paper to be processed as a sketch painting, the preserving device 72 works directly to spray the fixative fluid on the paper, and then the mounting device 73 mounts. The mounted paper is received and sorted by the paper printing module 6.

The foregoing is only a preferred embodiment of the invention and does not limit the scope of patent protection of the invention. Any equivalent structure transformation made by using the description of the invention and the attached drawings, directly or indirectly applied to other relevant technical fields, is similarly included in the scope of protection of the invention.

What is claimed is:

1. An integrated system for art examination, connected with an examination administration network, wherein the integrated system comprises a power module, an information receiving and a storage module, an information processing module a control module, a display module, a paper printing module, and a paper processing module including a scanning device;

the power module is used to provide power support;

the information receiving and storage module is used to receive and transmit an examinees registration information, an examination room information and an on-site identity information to the information processing module;

the information processing module is used to verify whether the examinees registration information is consistent with the on-site identity information and transmits a conclusion to the control module;

the control module controls the display module, the paper printing module and the paper processing module;

the display module is used to display various information of each step to guide an exam worker how to operate, and an input of the examinee's on-site identity information is completed on the display module through a human-computer interaction;

the paper printing module is configured to print information on a paper and complete a sending and receiving of the paper;

the paper processing module is used for processing the paper according to a painting type and passing the processed paper to the paper printing module for collecting and sorting.

2. The integrated system for art examination according to claim 1, wherein the information receiving and storage module comprises a network transmission device, an identification device, and an input device, the network transmission device is connected with the examination administration network to receive the examinees registration information and the examination room information, the identification device is used to identify the examinee's on-site identity information, and the input device is used for inputting the examinee's on-site identity information and a situation description.

3. The integrated system for art examination according to claim 2, wherein the paper printing module comprises an information printing device, a paper sending device and a paper receiving device, the information printing device is used to print information on the paper, the paper sending device is used to send papers with printed information, and the paper receiving device is used to receive papers completed by examinees.

4. The integrated system for art examination according to claim 3, wherein the paper processing module comprises a drying device, a preserving device and a mounting device, the drying device, the preserving device and the mounting device are used to dry, preserve and mount papers respectively.

5. The integrated system for art examination according to claim 4, wherein the paper processing module comprises a scanning and checking device that includes the scanning device, the scanning and checking device is used to scan and check a completeness and the examinee information of the paper before the paper is preserved and mounted, and the examinee information of the paper is scanned and electronically uploaded to the examination administration network.

6. The integrated system for art examination according to claim 5, wherein the paper receiving device comprises a counter, a packer, and a wastepaper receiver, the counter is used for counting the number of mounted papers, the packer is used for packing the counted papers into a book, and the wastepaper receiver is used for receiving the examinees' waste papers.

7. The integrated system for art examination according to claim 2, wherein the identification device comprises a camera, a fingerprint collector and an ID card reader, the camera, the fingerprint collector and the ID card reader are respectively used to collect and transmit the examinee's on-site identity information, a fingerprint information and a ID card information to the information processing module.

8. An art examination method comprising:
   (1) starting a power source by exam workers firstly to activate an integrated system for the art examination;
   (2) receiving, by an information receiving and storage module of the integrated system that is automatically connected with an examination administration network, examination room information, examinees registration information and examination information from the examination administration network, and displaying, by a display module of the integrated system, the corresponding examination room information, the examinees registration information and the examination information;
   (3) entering, by the examinees, an examination room of the corresponding examination room information in turn and inputting, by the examinees, on site identity information of the examinees at the display module, the on-site identity information is received by the information receiving and storage module and then passed to an information processing module of the integrated system, and the information processing module verifies the on-site identity information of the examinees with the registration information received from the examination administration network;
   (4) if the information processing module verifies that the registration information and the on-site identity information for a given examinee of the examinees are inconsistent, terminating, by a control module of the integrated system, the given examinee's examination process; if the information processing module verifies that the registration information and the on-site identity information for the given examinee are consistent, controlling a paper printing module of the integrated system to print relevant information on a paper and output the paper to the given examinee as an indication that the given examinee passes verification;
   (5) sitting down and answering questions according to the relevant information on the paper by the given examinee after the given examinee receives the paper;
   (6) at the end of the art examination, submitting respective papers, including the paper received by the given examinee, by the examinees in turn, and selecting, by the exam workers, a corresponding processing method at the display module according to content of the art examination, and
   (7) receiving and processing the respective papers by a paper processing module of the integrated system according to a painting type and passing, by the paper processing module, the processed papers to the paper printing module for collecting and sorting.

9. The examination method according to claim 8, in the step (5), wherein when the examinees needs to leave the examination room halfway during the examination, the examinees must firstly be approved by the exam worker, then leave the examination room after identification at the display module; before re-entry, the examinees need to identify again at the display module before the examinees can enter again.

10. The examination method according to claim 8, in the step (5), wherein when the paper is damaged, the exam worker will judge whether the paper need be replaced; if the paper need be replaced, the exam worker input a situation description of the examinees at the display module, and then the integrated system will receive the wastepaper and output a new paper.

11. The integrated system for art examination according to claim 3, wherein the identification device comprises a camera, a fingerprint collector and an ID card reader, the camera, the fingerprint collector and the ID card reader are respectively used to collect and transmit the examinee's on-site identity information, a fingerprint information and a ID card information to the information processing module.

12. The integrated system for art examination according to claim 4, wherein the identification device comprises a camera, a fingerprint collector and an ID card reader, the camera, the fingerprint collector and the ID card reader are respectively used to collect and transmit the examinee's on-site identity information, a fingerprint information and a ID card information to the information processing module.

13. The integrated system for art examination according to claim 5, wherein the identification device comprises a camera, a fingerprint collector and an ID card reader, the camera, the fingerprint collector and the ID card reader are respectively used to collect and transmit the examinee's on-site identity information, a fingerprint information and a ID card information to the information processing module.

14. The integrated system for art examination according to claim 6, wherein the identification device comprises a camera, a fingerprint collector and an ID card reader, the camera, the fingerprint collector and the ID card reader are respectively used to collect and transmit the examinee's on-site identity information, a fingerprint information and a ID card information to the information processing module.

15. The examination method according to claim 9, wherein, in the step (5), wherein when the paper received by the given examinee is damaged, the a given exam worker of the exam workers will judges whether the paper received by the given examinee needs to be replaced; if the paper received by the given examinee needs to be replaced, the given exam worker inputs a situation description of the given examinee at the display module, and then the integrated system will receives the paper received by the given examinee as wastepaper and outputs a new paper.

* * * * *